J. REESE.
FURNACE FOR COAL OIL STILLS.
No. 35,838. Patented July 8, 1862.
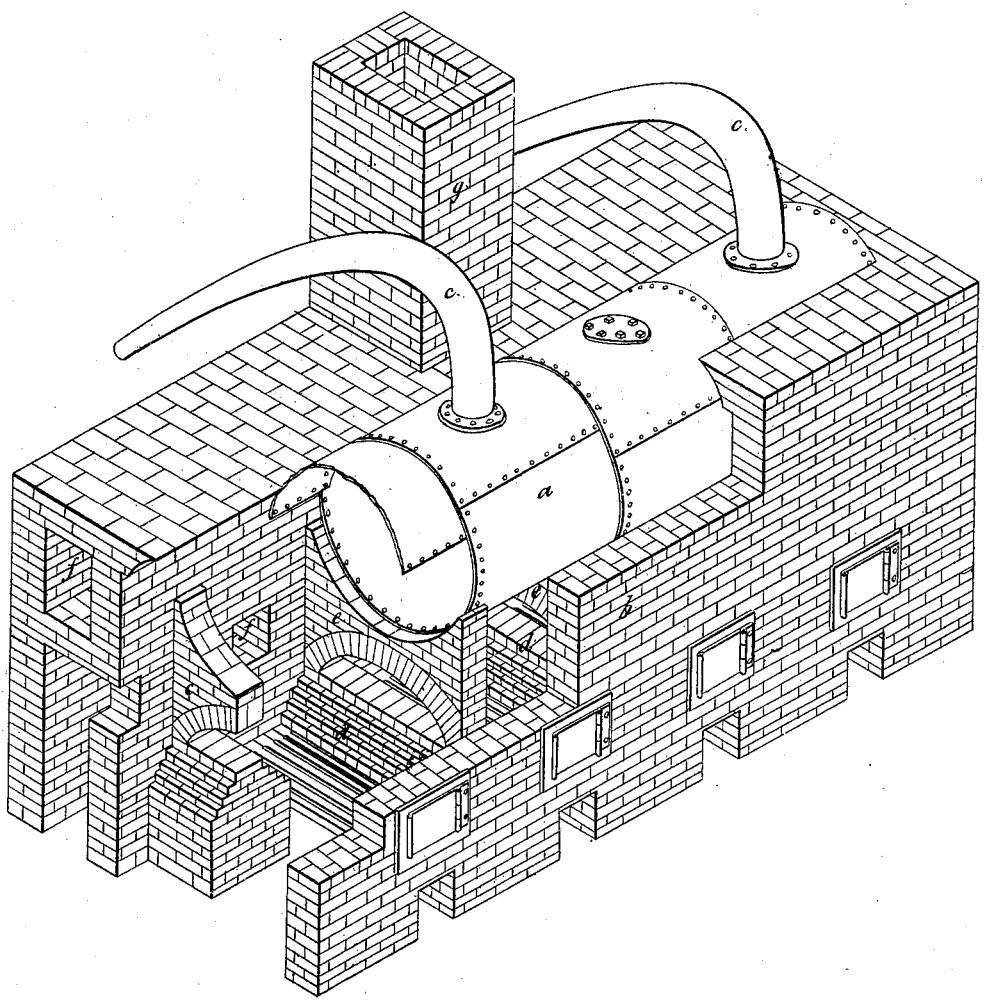
Witnesses:
L. P. Stone
M. G. Cushing
Inventors.
Jacob Reese
by his attorney
W. Bakewell

UNITED STATES PATENT OFFICE.

JACOB REESE, OF PITTSBURG, PENNSYLVANIA.

IMPROVEMENT IN FURNACES FOR COAL-OIL STILLS.

Specification forming part of Letters Patent No. 35,838, dated July 8, 1862.

*To all whom it may concern:*

Be it known that I, JACOB REESE, of Pittsburg, in the county of Allegheny and State of Pennsylvania, have invented a new and useful Improvement in the Construction of Furnaces and Stills for the Distillation of Carbon Oil, Coal-Oil, and other Similar Fluids; and I do hereby declare the following to be a full, clear, and exact description thereof, reference being had to the annexed drawing, forming part of this specification.

In the distillation of carbon oil or petroleum it is found very desirable to use stills of the largest capacity. There are several important reasons for this, arising from the peculiar nature of the substance to be treated. Petroleum and oil produced from coal, which I shall designate by the general name of "carbon oil," are of a highly volatile nature, and boil at a low degree of heat as compared with other oils, so that it requires great care and attention to prevent the liquid contents of the still boiling over into the worms, through which the vapor alone should pass. This of course would spoil the whole of the distilled oil in the condenser by mixing with it that which is impure and highly colored. This difficulty is in a great measure overcome by the use of large stills, because where the body of oil is greater a much higher heat may be applied to the still without raising the temperature of its contents to a dangerous degree, but only hastening the process of distillation. A further reason is that carbon oil, being very volatile and highly inflammable, and its vapor, when admixed with a certain proportion of atmospheric air, being highly explosive, the greatest care is required in the process of distillation. To prevent accident from these causes it is therefore important to employ as few stills as possible in a manufactory, so as to reduce the liability to these disasters, for a still of large capacity requires no more watching or care, and is easier to manage, than a small one. Then, again, the product of distillation from a large still is much more uniform than from a small one, because it is easier to preserve a uniform degree of heat in the use of the former than of the latter.

A great practical difficulty in the use of stills of large capacity has hitherto prevented their successful adaption. This proceeds from the extreme tenuity of carbon oil, which makes it very difficult to construct a vessel, even of metal, with joints sufficiently close to prevent its leaking. Stills of cast-iron have been tried; but these are very unsafe, owing to their liability to crack, especially when of large size, and any leak or crack in a still used for the distillation of carbon oil is in the highest degree dangerous, because if its contents are allowed to reach the fire a conflagration or explosion would be the immediate result.

In stills made of wrought-iron or other sheet metal, even when the joints are carefully lapped and riveted, the contraction and expansion of the metal by the heat and change of temperature will open the seams and rivet-holes sufficiently to allow the oil to escape. To remedy this, stills have been made of large diameter, with the bottom plate, which is exposed to the direct action of the fire, in one piece; but there is of course a limit to this, as sheets of wrought-iron cannot be made beyond a certain size, and a short still of large diameter is not by any means so good as one of small diameter and greater length, as in the former the fire-surface is necessarily too small for the bulk of oil it contains to effect a rapid distillation. For these reasons a still of comparatively small diameter is best, as it can be made of any desired length by rivetting the sheets together, provided some efficient means can be devised to prevent the leaking of the oil at the lap or through the rivet-holes.

If it be desired to make the still of cast-iron, the same difficulty occurs of keeping the joints tight where the sections are bolted together; and it is the design of my improvement to construct the stills, whether of cast or wrought iron, or other metal, and set them in their furnace in such manner as that the joints and seams of the still which are within the fire-chamber shall be effectually protected from the action of the fire.

To enable others skilled in the art to construct and use my improved stills and furnaces, I will proceed to describe their construction and operation.

In the drawing, *a* is the still, which may be of any desired shape, that of a cylinder of moderate diameter—say ten feet—being preferable. If of cast-iron, it may be made in hollow cylinders, with flanges at the ends, by which the cylinders are bolted together end to end, forming a still of any desired length. If constructed of wrought-iron, copper, or other sheet metal, the sheets are curved round, as in the making of boilers, the width or narrower dimension of the sheet being parallel to the axis of the cylinder. The sheets forming the lower part or bottom of the still are of such length as to extend over that part of the still which is exposed to the action of the fire in the fire-chamber of the furnace, which will be usually from one-third to one-half of its perimeter, and the ends of the sheets should be lapped and riveted in all cases at a point above the line of contact of the side or bottom of the still with the walls of the fire-chamber of the furnace $b$. If, however, the lapping of a sheet, or of the ends of two sheets, should occur on the under side of a still parallel to its axis within the fire-chamber, such joint is covered and protected from the action of the fire in the manner hereinafter described; but it is far better to avoid, if possible, having any of the joints parallel to the axis of the still within the fire-chamber. The sides of these metallic sheets are lapped and riveted, as many sections being united together as are requisite to form a still of the desired length, and the ends are closed with heads in the usual way. The sheets composing the still had better be of the same width for the sake of uniformity in building the furnace. The furnace $b$ is built with a fire-chamber, $d$, of the length and width of the still, which is set over it, the sides of the furnace inclosing the fire-chamber being built close to the sides and ends of the still, so that the fire cannot extend around the top of the still, and that any oil which may leak from the seams in the upper half of the still cannot find its way into the fire-chamber. The fire-chamber $d$ is divided into sections or compartments by the partition-walls $e\ e$, which are placed the same distance from center to center as the distance between the seams or joints of the sides of the sheets composing the still. These partition-walls are built up close to the under surface of the still, the top of the walls being inverted arcs of a circle of the same radius as the still, and before the still is placed on these partition-walls (which serve to support it) over the fire-chamber, the top of each partition-wall $e$ is covered with cement, so that the rivets and lap-joint at each seam around the still are embedded in cement, making the joints perfectly tight and completely protecting the under side of the still wherever the lap-joints and rivets occur from the action of the fire. The compartments thus formed in the fire-chamber are thrown together by arching the partition-walls $e\ e$, so as to allow the fire and heat to pass freely from one to the other, thus equalizing the temperature and preventing one part of the still from being exposed to a higher degree of heat than another. Back of these compartments is a flue, $f$, with which each connects, and from which the chimney $g$ is carried, the arrangement and location of the flue and chimney being varied at pleasure. By this construction it will be seen that a still may be made of any required length or capacity, and with a fire-chamber under it throughout its entire length, and yet at no point is any seam, joint, or rivet exposed to the action of the fire, nor can any oil escaping from any such joint or seam or rivet-hole reach the fire. In case the large diameter of the still should render it necessary to have one end of the seams or joints, which are parallel to its axis, in such a position as to lie within the fire-chamber, or if, by accident, one of the seams should be so placed, it may be covered substantially in the manner hereinbefore described, by building a wall under each joint or seam and in close contact therewith, such wall being arched or otherwise so raised above the grate-bars of the furnace as to allow the fire to pass freely under and on both sides of it.

On the top of the still are placed the goose-necks $c\ c$, which are constructed and attached in the usual manner. In my stills, however, instead of employing only one goose-neck to each still, as has heretofore been the practice, I employ two or more, each goose-neck being connected with a separate worm or condensing pipe. The object of this increase in the number of goose-necks is that thereby I am enabled to make use of worms or condensing pipes of smaller diameter than would otherwise suffice to carry off the vapor generated in the still, for as in two cylinders of equal length and different diameter the smaller one has a larger surface in proportion to its contents than the larger, therefore by reducing the diameter of the condensing-pipes and increasing their number I obtain a greater amount of condensing-surface, and am able to hasten the process of distillation, especially in stills of large capacity.

Having thus described my improvement in the mode of constructing and setting stills for the distillation of carbon oil, what I claim as my invention, and desire to secure by Letters Patent, is—

The mode hereinbefore described of constructing stills, the bottom of which is composed of more than one piece, and furnaces therefor in such manner that all the joints, seams, and rivets which are placed inside of the fire-chamber shall rest upon or be covered by walls or supports of brick-work or cement, and thus protected from the direct action of the fire, substantially in the manner and for the purpose hereinbefore set forth.

In testimony whereof I, the said JACOB REESE, have hereunto set my hand.

JACOB REESE.

Witnesses:
M. G. CUSHING,
A. S. NICHOLSON.